(12) United States Patent
Goodwin

(10) Patent No.: US 10,618,832 B2
(45) Date of Patent: Apr. 14, 2020

(54) APPARATUS AND METHODS FOR CREATING OPENINGS IN MATERIALS THAT SOLIDIFY

(71) Applicant: Samuel David Goodwin, Phoenix, AZ (US)

(72) Inventor: Samuel David Goodwin, Phoenix, AZ (US)

( * ) Notice: Subject to any disclaimer, the term of this patent is extended or adjusted under 35 U.S.C. 154(b) by 431 days.

(21) Appl. No.: 15/390,260

(22) Filed: Dec. 23, 2016

(65) Prior Publication Data

US 2017/0182676 A1 Jun. 29, 2017

Related U.S. Application Data

(60) Provisional application No. 62/387,490, filed on Dec. 24, 2015.

(51) Int. Cl.
| | |
|---|---|
| *B28B 7/16* | (2006.01) |
| *B29C 37/00* | (2006.01) |
| *B29C 39/26* | (2006.01) |
| *B29C 39/36* | (2006.01) |
| *B29C 33/00* | (2006.01) |
| *C03B 19/02* | (2006.01) |
| *B22D 23/02* | (2006.01) |
| *B22D 29/00* | (2006.01) |

(Continued)

(52) U.S. Cl.
CPC ............ *C03B 19/02* (2013.01); *B22D 23/02* (2013.01); *B22D 29/00* (2013.01); *B29C 33/0033* (2013.01); *B29C 39/02* (2013.01); *B29C 39/26* (2013.01); *B29C 39/36* (2013.01); *C04B 38/00* (2013.01); *C04B 40/00* (2013.01); *E04G 15/00* (2013.01); *E04G 15/061* (2013.01); *B29C 37/006* (2013.01); *B29L 2031/737* (2013.01)

(58) Field of Classification Search
CPC ....... C03B 19/02; E04G 15/061; E04G 15/00; C04B 40/00; C04B 38/00; B22D 29/00; B22D 23/02; B29C 33/0033; B29C 39/26; B29C 39/02; B29C 39/36; B29C 37/006; B29L 2031/737
See application file for complete search history.

(56) References Cited

U.S. PATENT DOCUMENTS

| | | |
|---|---|---|
| 2,787,820 A | 4/1957 | Shields |
| 5,169,544 A | 12/1992 | Stanfill |

(Continued)

*Primary Examiner* — Robert J Grun
(74) *Attorney, Agent, or Firm* — Lisa Foundation Patent Law Clinic at Arizona State University

(57) ABSTRACT

An apparatus and method for creating openings in a material that solidifies is disclosed. The apparatus comprises a rigid board and at least one rigid retainer plate. The rigid retainer plate comprises at least one buoyancy plate to resist the buoyant force of the material that solidifies, at least one hydrostatic plate to resist the hydrostatic force of the material that solidifies, and a retainer tie. The rigid board further comprises retainer plate slots configured to accept the retainer plates. When the apparatus is in use, the retainer plates are inserted into the retainer plate slots and the retainer ties are coupled to formwork panels. The material that solidifies is then poured into the gap between the formwork panels. Once the material is solidified, the formwork panels are removed and the apparatus can be either reused or thrown out. The apparatus may be used with any material that solidifies.

20 Claims, 14 Drawing Sheets

(51) Int. Cl.
*F25C 1/04* (2018.01)
*F25C 1/22* (2018.01)
*B29C 39/02* (2006.01)
*B28B 1/14* (2006.01)
*E04G 15/00* (2006.01)
*C04B 38/00* (2006.01)
*E04G 15/06* (2006.01)
*C04B 40/00* (2006.01)
*B29L 31/00* (2006.01)

(56) References Cited

U.S. PATENT DOCUMENTS

| | | |
|---|---|---|
| 5,987,830 A | 11/1999 | Worley |
| 6,550,194 B2 | 4/2003 | Jackson |
| 2010/0269433 A1* | 10/2010 | Westra .................... E04G 15/02 52/215 |

* cited by examiner

STATE-OF-ART

STATE-OF-ART

APPARATUS AND METHODS FOR CREATING OPENINGS IN MATERIALS THAT SOLIDIFY

CROSS REFERENCE TO RELATED APPLICATIONS

This patent claims priority to U.S. Provisional Patent Application No. 62/387,490, filed Dec. 24, 2015.

BACKGROUND

1. Field of the Invention

The embodiments of the invention disclosed herein generally fall within the field of the fixed building arts.

2. Description of Related Art

The current state of the art for creating openings in materials that solidify is expensive, time consuming, and does not allow for easy modification of the opening's shape. Today, persons having ordinary skill in the fixed building arts use framed bucks constructed out of either wood or metal to create openings in materials that solidify. Metal bucks have limited use because their shape and size are fixed. Wood bucks, while less expensive than metal, suffer from their own drawbacks. A skilled carpenter must normally be hired to create wooden bucks, and, in most instances, they can only be used once before they must be disposed of in a trash receptacle.

Foam bucks provide inexpensive, reusable alternatives to metal and wood bucks. Prior art embodiments of foam bucks, though, are not easily modifiable. Due to their design, these bucks require the use of plastic or metal frames to support the foam against the forces the material that solidifies exerts against the buck before it becomes solid.

So as to reduce the complexity and length of the Detailed Specification, and to fully establish the state of the art in certain areas of technology, Applicant(s) herein expressly incorporate(s) by reference all of the following materials identified in each numbered paragraph below.

U.S. Pat. No. 2,787,820 to Shields et al. describes a rectangular framed buck made of plywood that is used to support a metal window frame. This plywood frame is confined to rectangular openings and has only a limited number of uses before it begins to rot. The use of a prefabricated metal window frame also limits the shape of the opening created and the ability of the user to modify it's on the job site, as specialized metalworking tools would be needed.

U.S. Pat. No. 5,169,544 to Stanfill et al. describes a rectangular buck made of plastic. This buck must be prefabricated and is thus unable to be modified on the job site.

U.S. Pat. No. 6,550,194 to Jackson et al. describes a rectangular buck that uses a foam center surrounded by a metal frame. This metal frame is expensive and makes the buck's shape and dimensions almost impossible to modify without building a second, expensive metal frame.

U.S. Pat. Pub. No. 2010-0269433 to Westra describes a rectangular buck that uses foam and plastic panels to create a rectangular frame. These panels are connected at the vertices of the frame by fasteners. While this buck saves money on materials by using foam and plastic, it is confined to creating rectangular openings. This buck also suffers from having dimensions that are difficult to modify, as the extruded plastic portion of the panels must be cut using power tools or some type of industrial machinery.

U.S. Pat. No. 5,987,830 to Worley describes a retainer tie that is used to support a buck in an insulated concrete wall. The tie of Worley remains in the wall after it is complete and cannot be reused or recycled.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicant(s) will amend the specification to expressly recite the essential material that is incorporated by reference as allowed by the applicable rules.

SUMMARY

The present invention provides among other things an apparatus and method for creating openings in materials that solidify. This apparatus comprises a rigid board and at least one rigid retainer plate used to support the board against the forces exerted by the material that solidifies. The rigid board is in the shape of the desired opening and comprises at least one retainer plate slot, configured to receive the rigid retainer plate. The rigid retainer plate comprises at least one buoyancy plate, configured to support the board against the buoyancy force of the material that solidifies; at least one hydrostatic plate, configured to support the board against the hydrostatic force of the material that solidifies; and at least one retainer tie, configured to couple to a formwork panel.

To create an opening, one places the rigid retainer plates into the retainer plate slots of the rigid board, couples the rigid retainer plates to at least two formwork panels, and then pours the material that solidifies into the gap between the formwork panels. Once the material has solidified, the formwork panels and the apparatus, comprising the rigid board and the rigid retainer plates, are removed.

In one embodiment, an apparatus for creating an opening in a material that solidifies comprises a rigid board and at least one rigid retainer plate. The rigid board may further comprise at least one retainer plate slot. The rigid retainer plate may further comprise at least one hydrostatic plate, at least one buoyancy plate, and at least one retainer tie. The at least one buoyancy plate may be coupled to the hydrostatic plate, and the at least one retainer tie may be coupled to at least one of the hydrostatic plate and the buoyancy plate. The rigid retainer plate may be configured to be inserted into the at least one retainer plate slot.

In one embodiment, the rigid board may further comprise a geometric shape. In one embodiment, the rigid board may be further comprised of foam. In one embodiment, the retainer plate may be comprised of metal, plastic, or wood. In one embodiment, the rigid board may further comprise an opening therethrough.

In one embodiment, a method of creating an opening in a material that solidifies may comprise inserting at least one rigid retainer plate into at least one retainer plate slot within a rigid board, wherein the at least one rigid retainer plate comprises at least one retainer tie; coupling a first end of the at least one retainer tie to a first formwork panel; coupling a second end of the at least one retainer tie to a second formwork panel; pouring the material that solidifies into a space between the first and second formwork panels; uncoupling the first formwork panel from the first end of the at least one retainer tie after the material is solidified; uncoupling the second formwork panel from the second end of the at least one retainer tie after the material is solidified; removing the rigid board from the solidified material.

In one embodiment, the method may further comprise removing the at least one rigid retainer plate from the at least one retainer plate slot and disposing of the rigid board in a waste receptacle. In one embodiment, the method may further comprise removing the at least one rigid retainer plate from the at least one retainer plate slot and recycling the rigid board. In one embodiment, the method may further comprise curing the material that solidifies. In one embodiment, the method may further comprise creating a condition that solidifies the material. In one embodiment, the method may further comprise removing air bubbles from the material that solidifies via vibration. In one embodiment, the method may use concrete, a resin, water, metal, plaster, a ceramic, or glass. In one embodiment, the method may further comprise removing the at least one rigid retainer plate from the at least one retainer plate slot and recycling the at least one rigid retainer plate.

In one embodiment, a method of creating an opening in concrete may comprise inserting at least one rigid retainer plate into at least one retainer plate slot within a rigid board, wherein the at least one rigid retainer plate comprises at least one retainer tie; coupling a first end of the at least one retainer tie to a first formwork panel; coupling a second end of the at least one retainer tie to a second formwork panel; pouring the concrete into a space between the first and second formwork panels; uncoupling the first formwork panel from the first end of the at least one retainer tie after the concrete is hardened; uncoupling the second formwork panel from the second end of the at least one retainer tie after the concrete is hardened; and removing the rigid board from the hardened concrete.

In one embodiment, the method of creating an opening in concrete may further comprise removing air bubbles from the concrete via vibration. In one embodiment, the method of creating an opening in concrete may further comprise removing the at least one rigid retainer plate from the at least one retainer plate slot and disposing of the rigid board in a waste receptacle. In one embodiment, the method of creating an opening in concrete may further comprise removing the at least one rigid retainer plate from the at least one retainer plate slot and recycling the rigid board. In one embodiment, the method of creating an opening in concrete may further comprise removing the at least one rigid retainer plate from the at least one retainer plate slot and recycling the at least one rigid retainer plate.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographers, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 8:
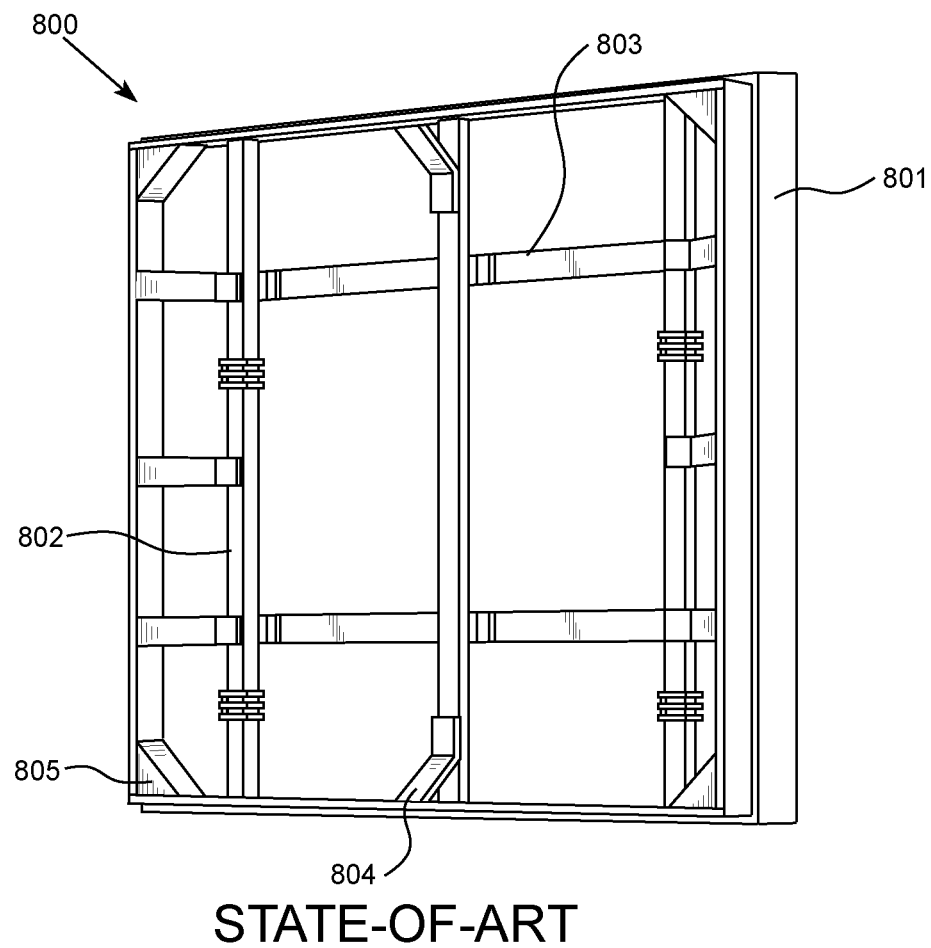
FIG. 8 depicts a prior art framed buck.

Referring now to FIG. 8, a prior art framed buck 800 is shown. This prior art buck resists the forces exerted on it by the material that solidifies by using an external frame 801, vertical bars 802, and horizontal bars 803. Bracers 804 and corner reinforcing gussets 805 further reinforce the structure of the prior art buck.

Figure 1A:
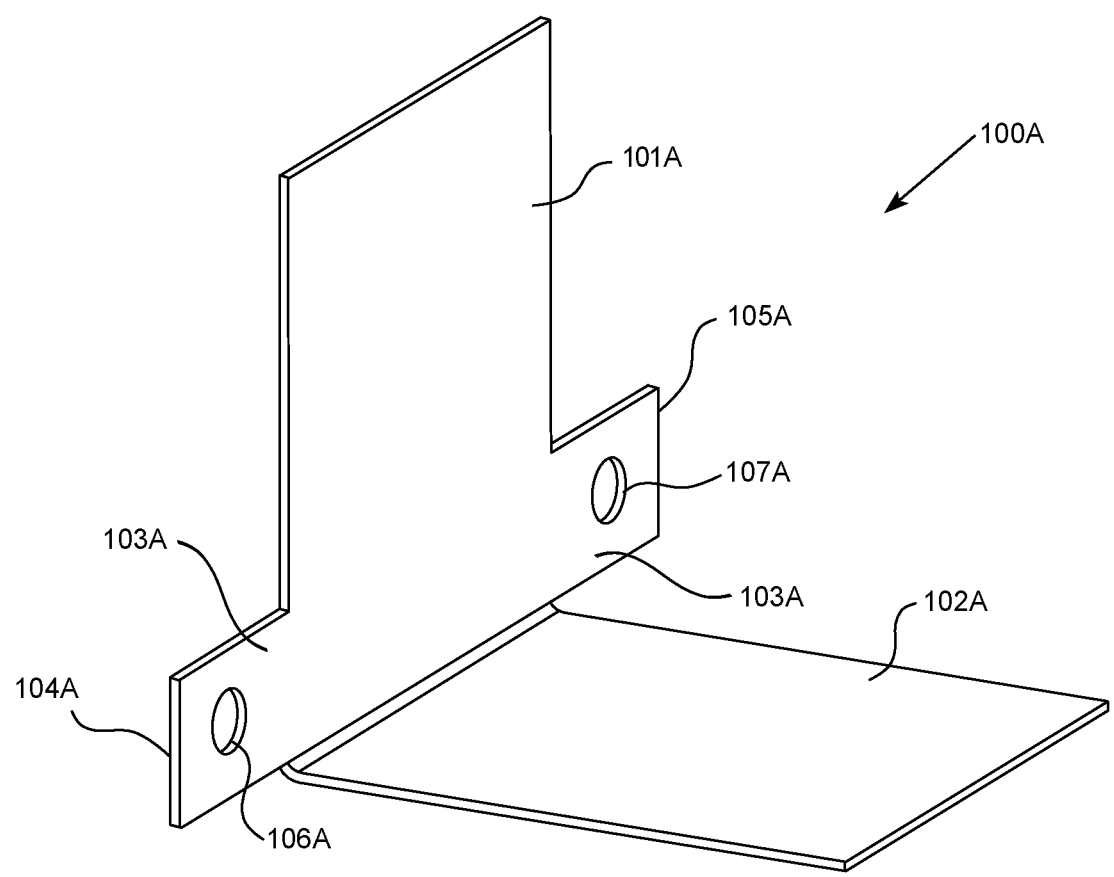
FIG. 1A depicts an implementation of a rigid retainer plate comprising one buoyancy plate, one hydrostatic plate, and one retainer tie.

Referring now to FIG. 1A, an embodiment of a rigid retainer plate 100A is shown. The rigid retainer plate may comprise a variety of materials that are preferably sufficient to resist the forces exerted by the material that solidifies. Metal, wood, and plastic are exemplary materials that possess the qualities required to comprise the rigid retainer plate, but a person having ordinary skill in the art may know of other suitable materials. This embodiment comprises one hydrostatic plate 101A coupled to one buoyancy plate 102A. Other embodiments may comprise a plurality of hydrostatic plates and buoyancy plates. In some embodiments, there will be more hydrostatic plates than buoyancy plates. In other embodiments, there will be more buoyancy plates than hydrostatic plates. In some embodiments, there will be equal numbers of hydrostatic plates and buoyancy plates. In this embodiment, the hydrostatic plate and buoyancy plate comprise rectangular shapes. In this embodiment, a retainer tie 103A is coupled to and integrated with the hydrostatic plate 101A. In this embodiment, the retainer tie comprises an elongated rectangular shape. This embodiment of the retainer tie further comprises two ends 104A, 105A and two openings 106A, 107A proximate to the two ends that allow coupling to a formwork panel using a dowel and pin system. The hydrostatic plate, buoyancy plate, and retainer tie may be coupled together using various methods depending on the materials they comprise. Welding, gluing, nailing, screwing, using fasteners, joints, casting the rigid retainer plate as one piece, or forming the rigid retainer plate as one piece are all acceptable methods of coupling the elements of the rigid retainer plate. The retainer tie may be coupled to either the hydrostatic plate or the buoyancy plate, and its specific location will depend on the configuration of the formwork panel. In this embodiment, the hydrostatic plate and buoyancy plate are coupled along their lengthwise edges. In other embodiments, the hydrostatic plate and buoyancy plate may have the face of one of the plates coupled to the edge of another plate. In this embodiment, the hydrostatic plate and buoyancy plate are coupled at a ninety-degree angle. In other embodiments, the hydrostatic plate and buoyancy plate may be coupled at an angle between zero and one hundred eighty degrees. The thickness of the hydrostatic pate, buoyancy plate, and retainer tie depends on the material that they comprise and the forces that they must resist. Hydrostatic plates, buoyancy plates, and retainer ties that comprise weaker materials, such as wood and plastic, will therefore be thicker than ones comprised of stronger materials, such as metal. In some embodiments, the metal that comprises the hydrostatic plate, buoyancy plate, and retainer tie has a standard thickness of 0000000 to 38 gauge.

Figure 1B:
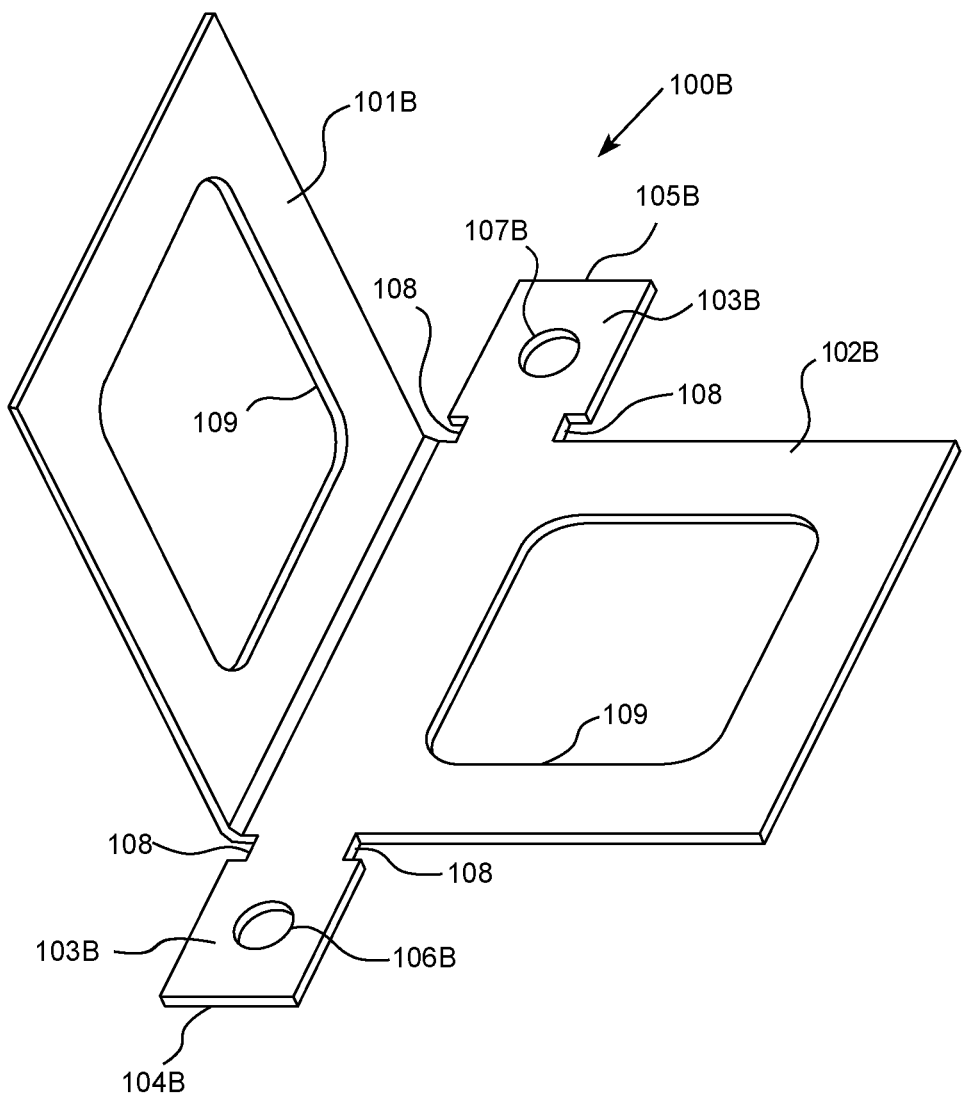
FIG. 1B depicts an implementation of a rigid retainer plate comprising one buoyancy plate, one hydrostatic plate, one retainer tie, and two openings.

Referring now to FIG. 1B, an embodiment of a rigid retainer plate 100B is shown. This embodiment comprises one hydrostatic plate 101B coupled to one buoyancy plate 102B. In this embodiment, a retainer tie 103B is coupled to and integrated with the buoyancy plate 102B. The retainer tie 103B further comprises two ends 104B, 105B and two openings 106B, 107B that are configured to couple to a formwork panel. In this embodiment, the retainer tie 103B further comprises four notches 108 that are positioned at the edge of the buoyancy plate, and allow for the passage of structural supports for the material that solidifies, such as rebar or wooden dowels. In other embodiments, the notches may be positioned on the retainer tie at other locations. In this embodiment, the hydrostatic plate 101B and buoyancy plate 102B further comprise openings on the faces of the plates 109 that save weight and costs by using less material.

Figure 2:
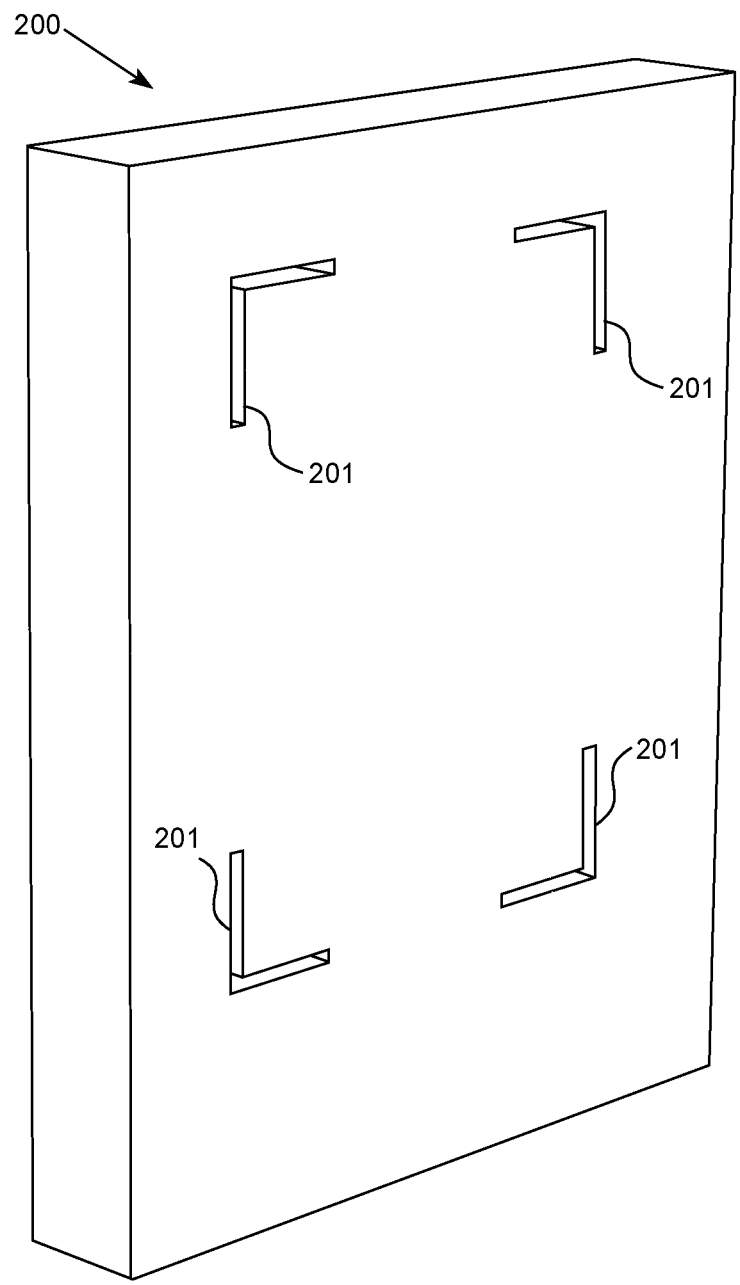
FIG. 2 depicts an implementation of a rectangular rigid board comprising four retainer plate slots configured to receive rigid retainer plates comprising one buoyancy plate and one hydrostatic plate.

Referring now to FIG. 2, a rectangular embodiment of the rigid board 200 is shown. The rigid board may comprise any number of materials that are inexpensive, easy to manipulate, and of a suitable density to resist the forces exerted by the material that solidifies. For example, a rigid board may be made of foam because foam can have a variable density, is inexpensive to produce, and is easily manipulated at a job site using a hand saw or another rudimentary cutting implement. In an embodiment where the apparatus and method are used for creating openings in concrete, it is preferable that the rigid board have a density of at least one pound per cubic foot so that it may resist the forces exerted by the liquid concrete. This embodiment comprises four retainer plate slots 201 configured to receive retainer plates comprising one hydrostatic plate and one buoyancy plate. It is preferable that the retainer plate slots have an opening at least large enough to receive the thinnest embodiment of the retainer plate. The orientation and location of retainer plate slots on the rigid board may change depending on the desires of the user and the configuration of the formwork panels. Horizontal spacing between the retainer plate slots will generally be distances measured in multiples of six inches to accommodate standard formwork panels, but if custom formwork panels are used this distance may be different. The number of retainer plate slots in a rigid board depends on the desire of the user, the amount of support needed to resist the forces of the material that solidifies, and the configuration of the formwork panel being used. A rigid board must have at least one retainer plate slot.

Figure 3A:
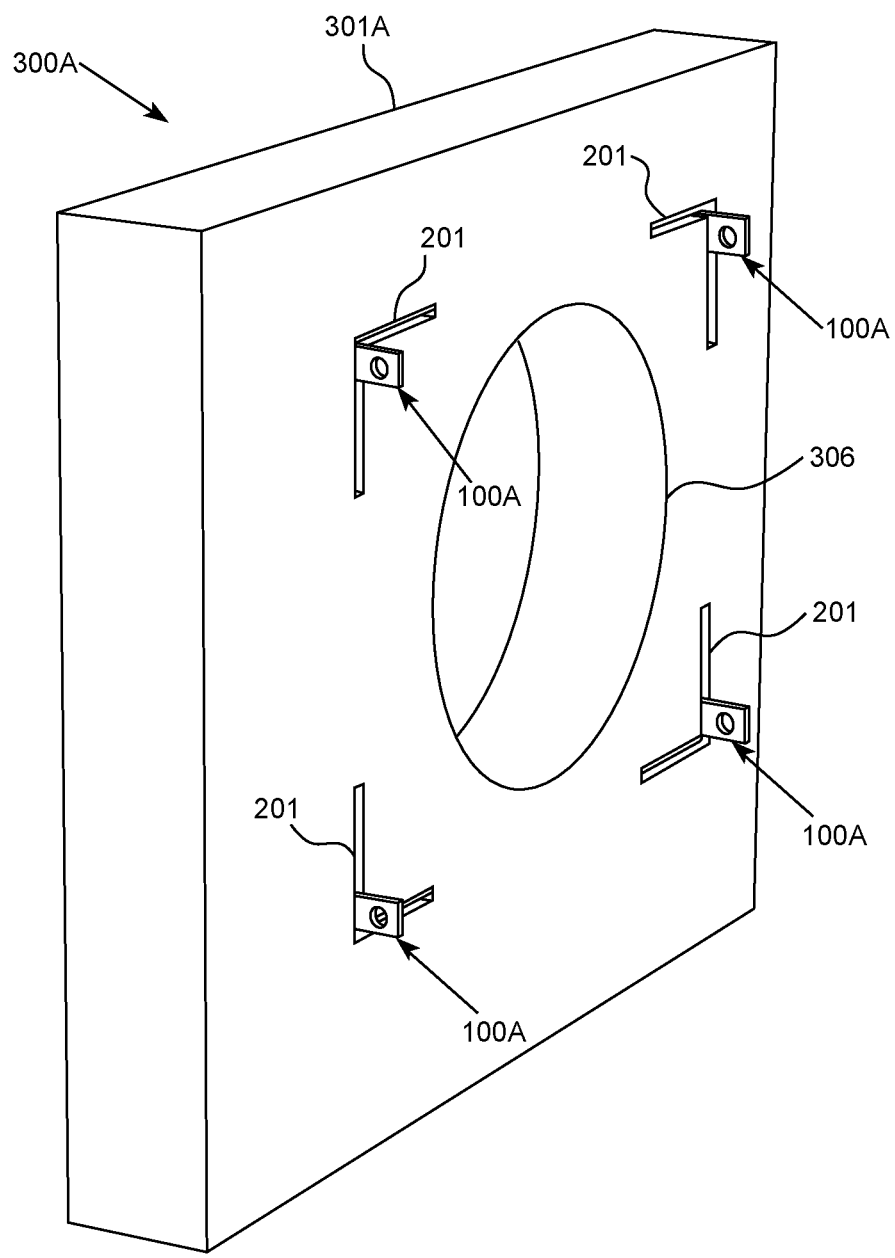
FIG. 3A depicts an implementation of an apparatus for creating openings in materials that solidify comprising a square rigid board with an opening therethrough and four rigid retainer plates inserted into four retainer plate slots.

Referring now to FIG. 3A, an embodiment of the apparatus for creating openings in materials that solidify 300A is shown. This embodiment comprises a square rigid board 301A. The square rigid board of this embodiment further comprises four retainer plate slots 201 configured to receive rigid retainer plates comprising one buoyancy plate and one hydrostatic plate. This embodiment of the apparatus further comprises four rigid retainer plates 100A inserted into the four retainer plate slots 201. It is preferable that, when using standard formwork panels, the end of the retainer tie extend out of the rigid board to enable it to successfully couple to the standard formwork panels, but this may not be the case if non-standard formwork panels are used. Lengths of preformed retainer ties come in one inch increments starting at four inches long, but if custom built or non-standard retainer ties are used their length and increments may be different. It is preferable that the length of the hydrostatic plates and buoyancy plates be the same or less than the thickness of the rigid board. This enables standard formwork panels to lay flush against the rigid board when the apparatus is in use. The board of this embodiment further comprises an opening therethrough 306, which may be used to allow for the passage of preexisting structures, such as pipes or wires, or may be present when the rigid board is comprised of multiple, recycled pieces.

Figure 3B:
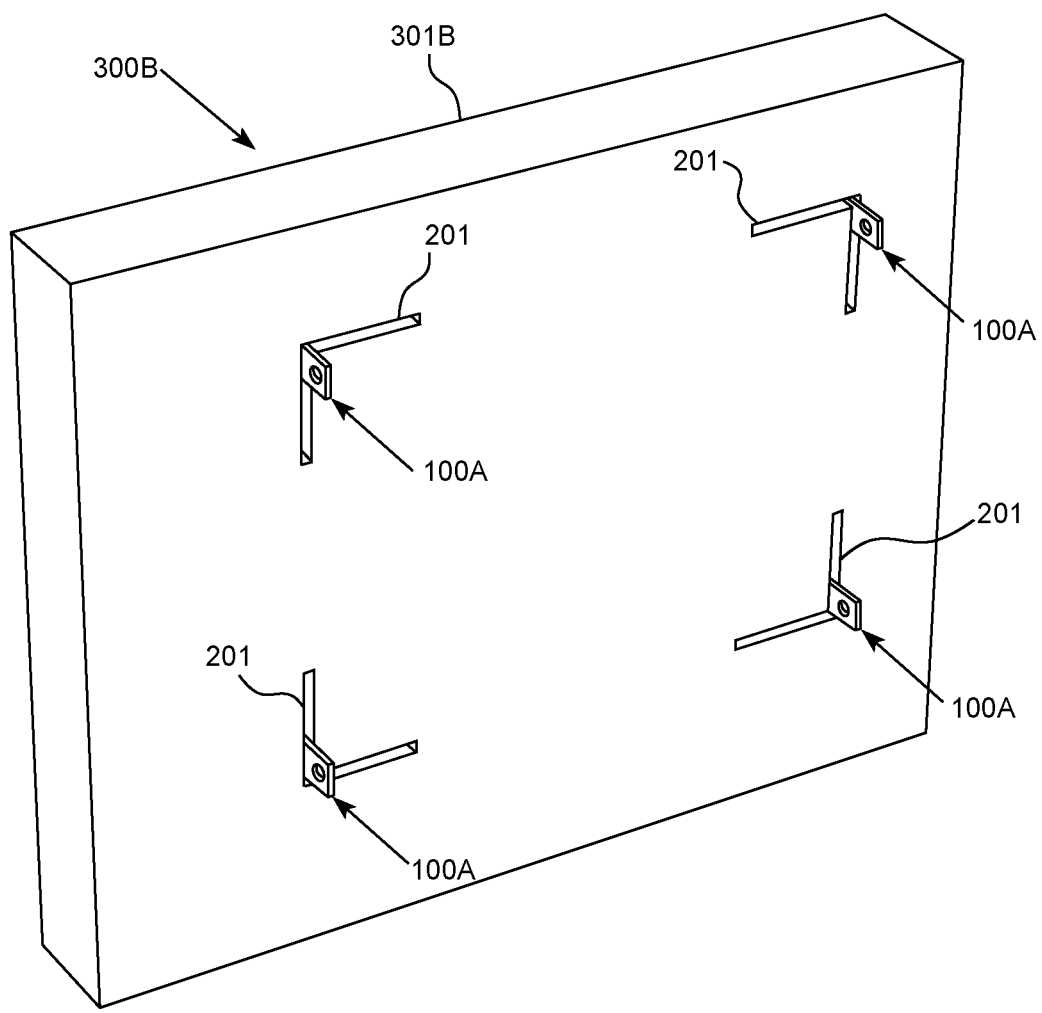
FIG. 3B depicts an implementation of an apparatus for creating openings in materials that solidify comprising a rectangular rigid board with four rigid retainer plates inserted into four retainer plate slots.

Referring now to FIG. 3B, an embodiment of the apparatus for creating openings in materials that solidify 300B is shown. This embodiment comprises a rectangular rigid board 301B. The rectangular rigid board of this embodiment further comprises four retainer plate slots 201 configured to receive rigid retainer plates comprising one buoyancy plate and one hydrostatic plate. This embodiment of the apparatus further comprises four rigid retainer plates 100A inserted into the four retainer plate slots 201.

Figure 4A:
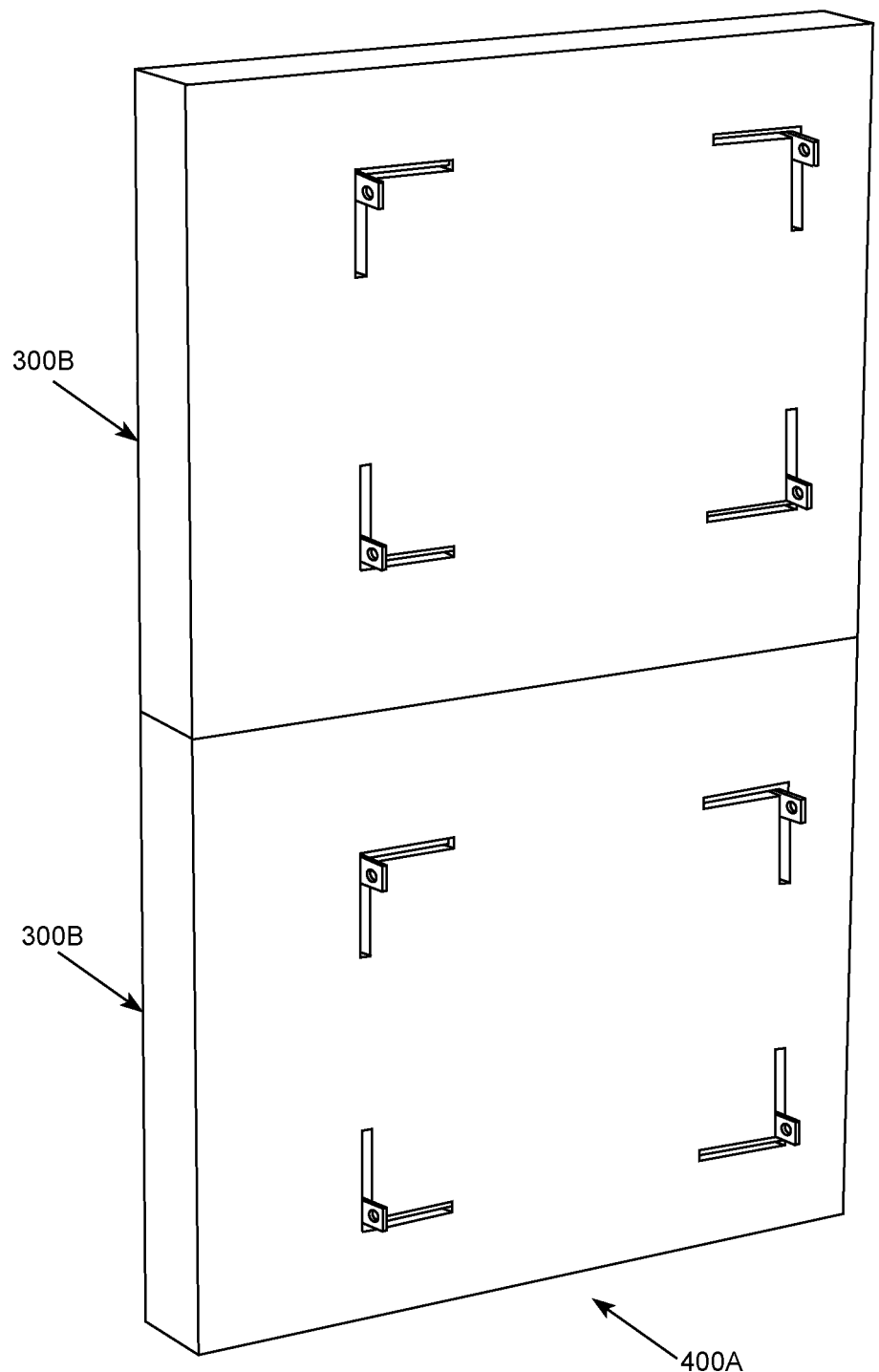
FIG. 4A depicts an implementation of an apparatus for creating openings in materials that solidify comprising two square rigid boards with a total of eight rigid retainer plates inserted into eight retainer plate slots.

Referring now to FIG. 4A, an embodiment of the apparatus for creating openings in materials that solidify 400A is shown. This embodiment comprises two of the previous embodiments 300B coupled together. The coupling of rigid boards may be accomplished using a variety of methods. Gluing, using joints, using fasteners, nailing, screwing, or simply stacking one rigid board on top of another are all acceptable methods of coupling two rigid boards together, but other methods may also exist.

Figure 4B:
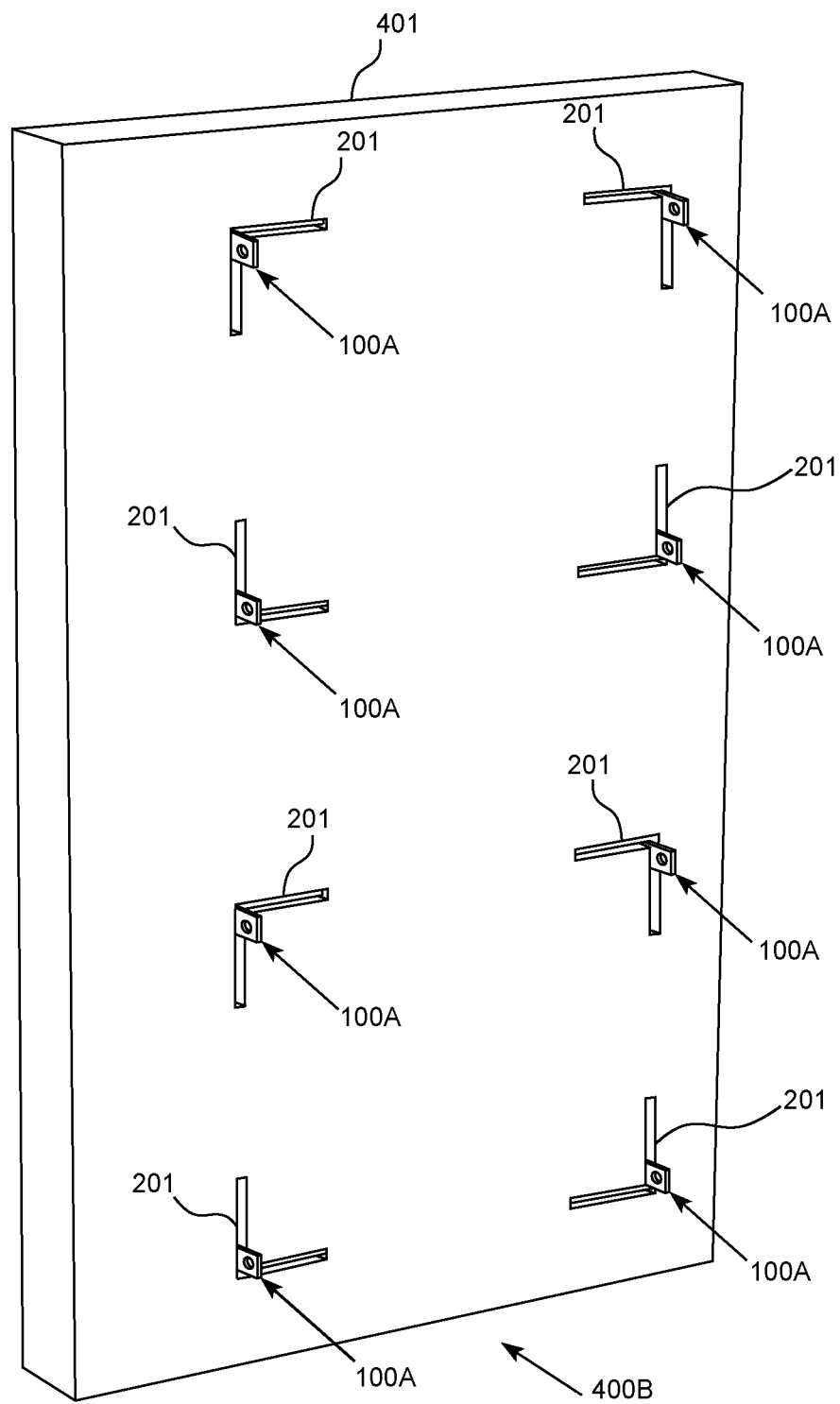
FIG. 4B depicts an implementation of an apparatus for creating openings in materials that solidify comprising a rectangular rigid board with eight rigid retainer plates inserted into eight retainer plate slots.

Referring now to FIG. 4B, an embodiment of the apparatus for creating openings in materials that solidify 400B is shown. This embodiment comprises one rectangular rigid board 401, eight retainer plate slots 201 configured to receive retainer plates comprising one buoyancy plate and one hydrostatic plate, and eight inserted rigid retainer plates 100A.

Figure 5A:
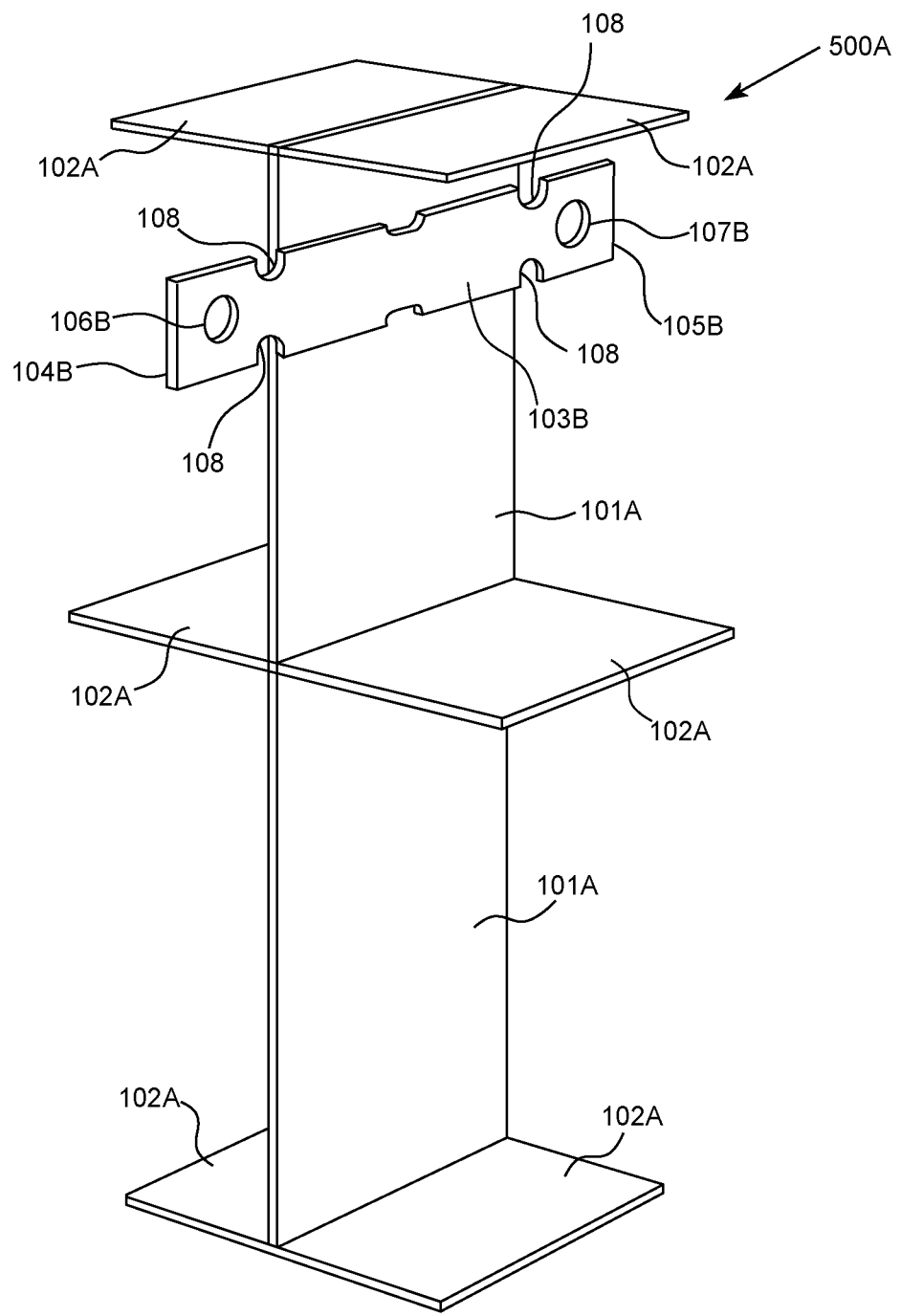
FIG. 5A depicts an implementation of a rigid retainer plate comprising six buoyancy plates, two hydrostatic plates, and one retainer tie.

Referring now to FIG. 5A, an embodiment of the rigid retainer plate 500A is shown. This embodiment comprises two hydrostatic plates 101A and six buoyancy plates 102A. In this embodiment, the hydrostatic plates are coupled to each other along their lengthwise edges to create a central axis for the retainer plate. The buoyancy plates are coupled to the hydrostatic plates along their lengthwise edges the so that they extend horizontally out from the central axis at right angles. In some embodiments where a plurality of hydrostatic plates and a plurality of buoyancy plates are used, the plates may be coupled together along the same or disparate axes. There is no requirement that hydrostatic plates be coupled along the same axis, and there is no requirement that buoyancy plates be coupled along the same axis. This embodiment further comprises a retainer tie 103B coupled to a face of the hydrostatic plate on its face. In other embodiments, the retainer tie may be coupled to the face or edge of the hydrostatic plate or buoyancy plate on its face or edge. The retainer tie 103B of this embodiment further comprises four notches 108 that are positioned at the edge of the buoyancy plate, and allow for the passage of structural supports for the material that solidifies, such a rebar or wooden dowels. This retainer tie further comprises two ends 104B, 105B and two openings 106B, 107B proximate to the two ends that allow coupling to a formwork panel.

Figure 5B:
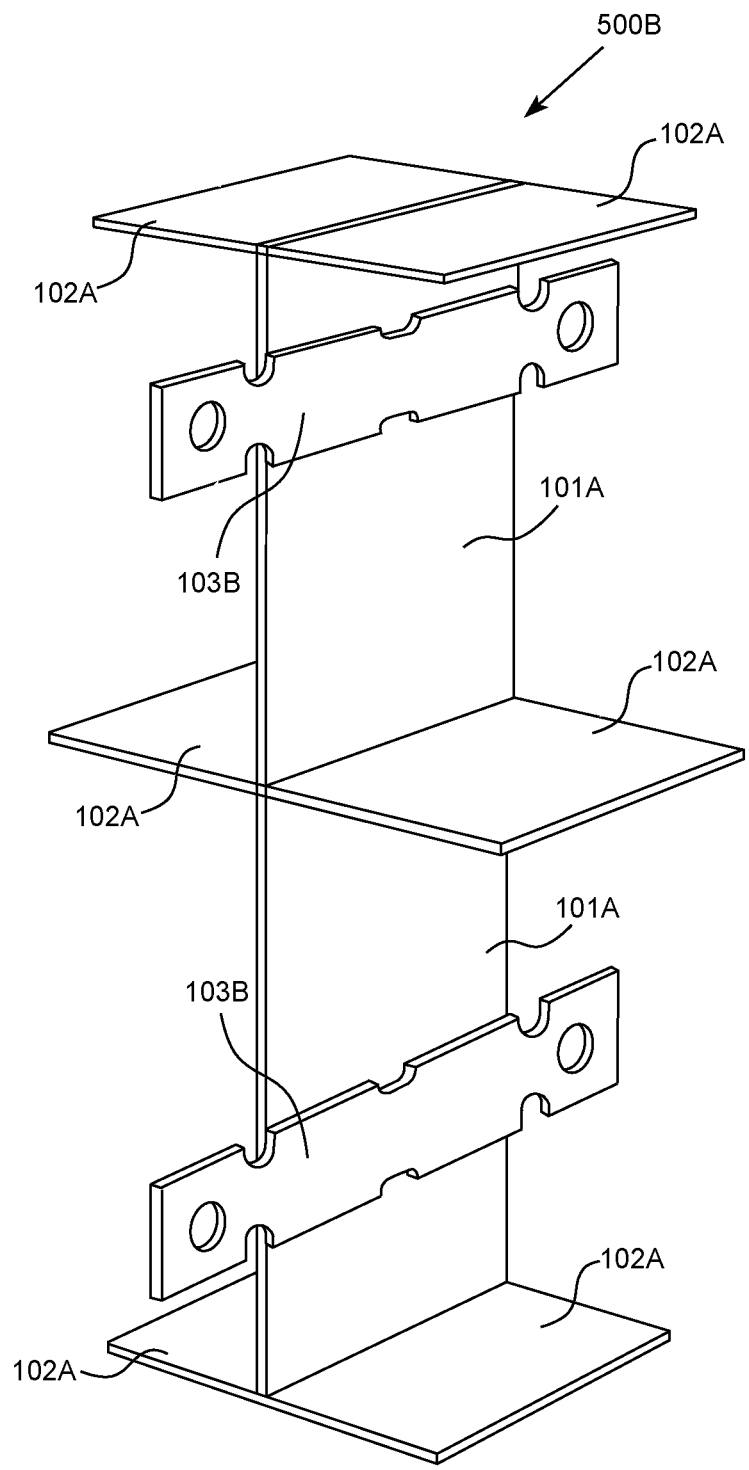
FIG. 5B depicts an implementation of a rigid retainer plate comprising six buoyancy plates, two hydrostatic plates, and two retainer ties.

Referring now to FIG. 5B, an embodiment of the rigid retainer plate 500B is shown. This embodiment comprises two hydrostatic plates 101A and six buoyancy plates 102A. This embodiment further comprises two retainer ties 103B.

Figure 6:
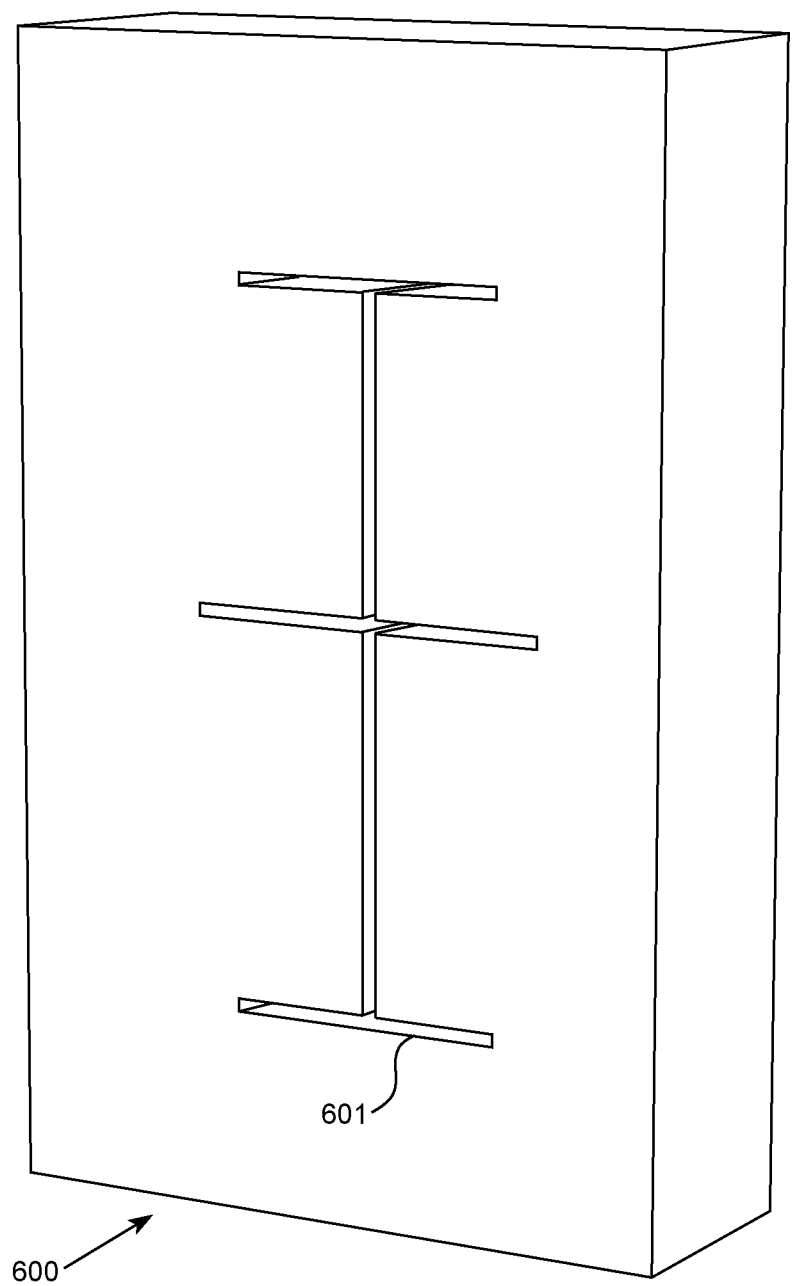
FIG. 6 depicts an implementation of a rectangular rigid board with a retainer plate slot configured to receive a rigid retainer plate comprising six buoyancy plates and two hydrostatic plates.

Referring now to FIG. 6, a rectangular embodiment of a rigid board 600 is shown. This embodiment comprises a retainer plate slot 601, which is configured to receive a rigid retainer plate comprising two hydrostatic plates and six buoyancy plates.

Figure 7A:
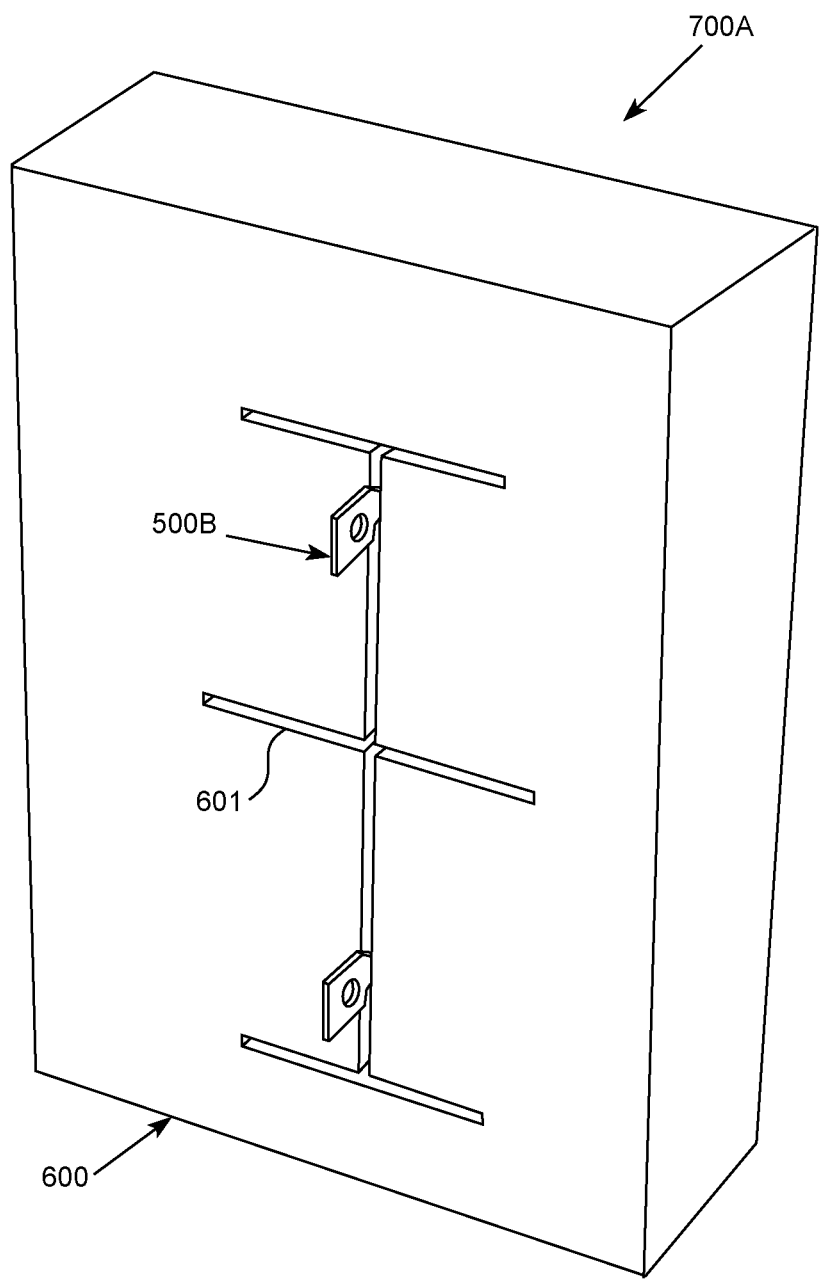
FIG. 7A depicts an implementation of an apparatus for creating openings in materials that solidify comprising a rectangular rigid board with a rigid retainer plate, comprising six buoyancy plates, two hydrostatic plates, and two retainer ties, inserted into the retainer plate slot.

Referring now to FIG. 7A, an embodiment of the apparatus for creating openings in materials that solidify 700A is shown. This embodiment comprises a rectangular rigid board 600. This rigid board further comprises a retainer plate slot 601, which is configured to receive an embodiment of the rigid retainer plate comprising two hydrostatic plates and six buoyancy plates. The apparatus further comprises an embodiment of the rigid retainer plate 500B, which comprises two hydrostatic plates and six buoyancy plates.

Figure 7B:
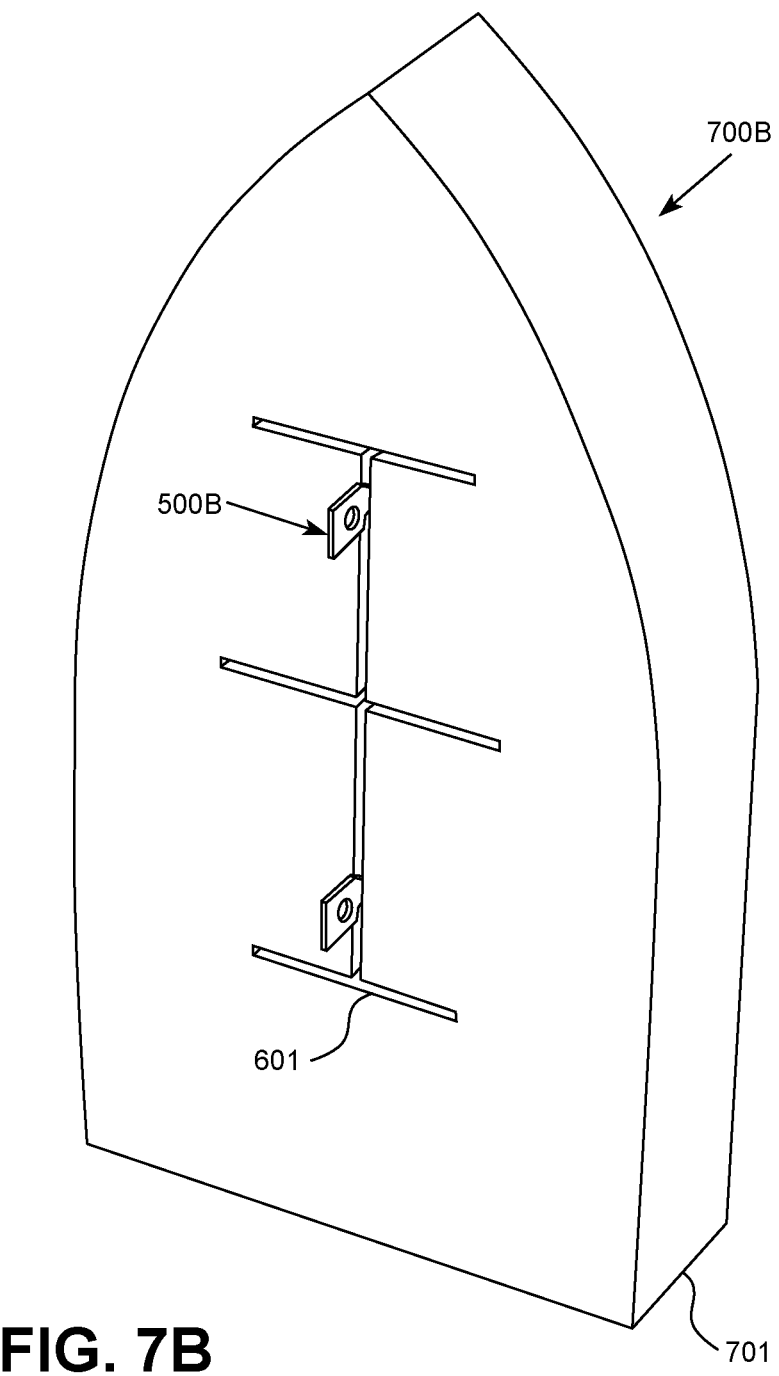
FIG. 7B depicts an implementation of an apparatus for creating openings in materials that solidify comprising a two-centered arch shaped rigid board with a rigid retainer plate, comprising six buoyancy plates, two hydrostatic plates, and two retainer ties, inserted into the retainer plate slot.

Referring now to FIG. 7B, an embodiment of the apparatus 700B is shown. This embodiment comprises a two-centered arch shaped rigid board 701. The rigid board may comprise any shape imaginable as to facilitate the creation of any shaped opening. For example, the rigid board's shape may comprise a balbis, concave polygon, constructible polygon, convex polygon, cyclic polygon, equiangular polygon, equilateral polygon, polyform, regular polygon, simple polygon, tangential polygon, henagon, digon, triangle, acute triangle, equilateral triangle, isosceles triangle, obtuse triangle, rational triangle, right triangle, 30-60-90 triangle, isosceles right triangle, Kepler triangle, scalene triangle, quadrilateral, cyclic quadrilateral, square, diamond, kite, parallelogram, rhombus, Lozenge, rhomboid, rhomb, rectangle, square, rectagon, quadrangle, quadragon, tangential quadrilateral, trapezus, trapezoid, isosceles trapezoid, pentagon, regular pentagon, pentagonoid, hexagon, Lemoine hexagon, heptagon, octagon, regular octagon, nonagon, decagon, regular decagon, hendecagon, dodecagon, hexadecagon, icosagon, swastika, star polygon, hexagram, star of David, heptagram, octagram, star of Lakshmi, decagram, pentagram, annulus, arbelos, circle, circular sector, circular segment, crescent, Indalo, lens, vesica piscis (fish bladder), lune, Reuleaux polygon, salinon, semicircle, tomahawk, triquetra, asteroid, cardioid, deltoid, ellipse, heart, heartagon, lemniscate, oval, ovoid, superellipse, and magatama. The foregoing list of shapes is not exhaustive, and a person having ordinary skill in the art would understand that the rigid board can comprise any shape imaginable. This embodiment further comprises a retainer plate slot 602 configured to receive an embodiment of the rigid retainer plate comprising two hydrostatic plates and six buoyancy plates. The apparatus further comprises an embodiment of the rigid retainer plate 500B inserted into the retainer plate slot 601.

Figure 9:
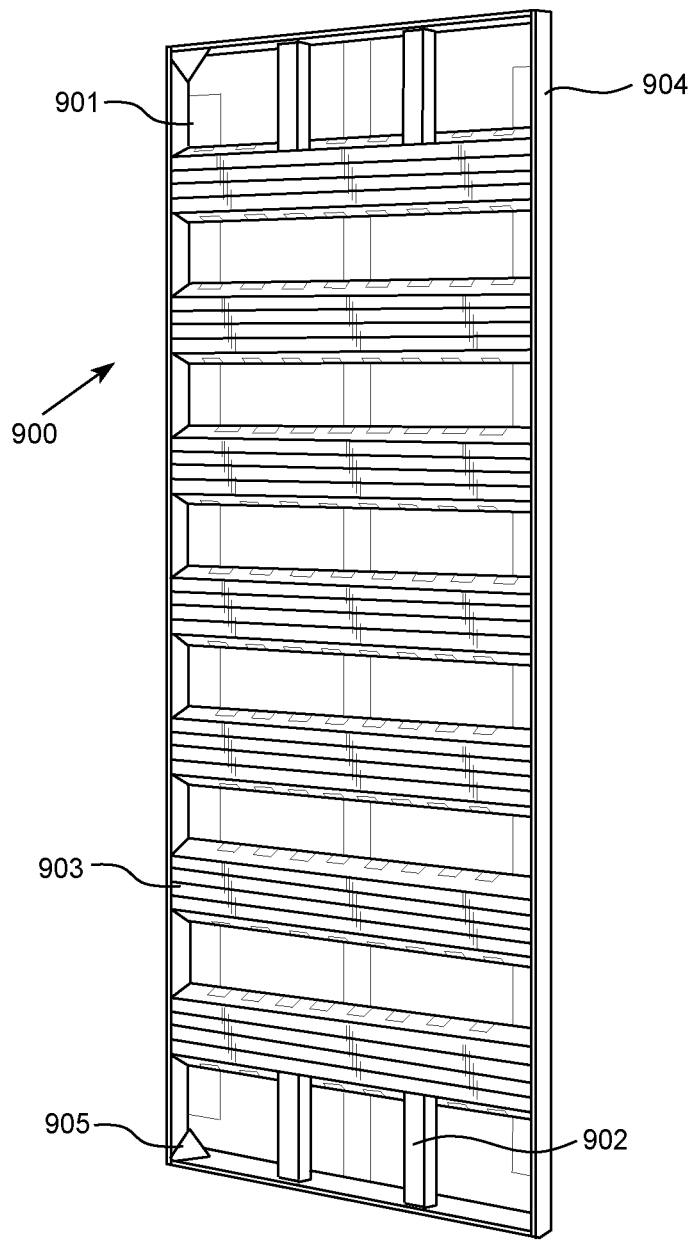
FIG. 9 depicts a state of the art formwork panel.

Referring now to FIG. 9, an embodiment of a state of the art formwork panel 900 is shown. This embodiment is comprised of vertical perimeter members 901, vertical stiffening members 902, horizontal members 903, an external frame 904, and corner reinforcing gussets 905.

Referring now to the method of using the apparatus, in some embodiments the rigid board may be reused, recycled, or disposed of in a waste receptacle, such as a trach can or landfill. In some embodiments, the rigid retainer plates may also be reused, recycled, or disposed of in a waste receptacle, such as a trash can or landfill. In some embodiments of the method, the specific identity of the material that solidifies will require that additional steps be performed before it can solidify. This may include curing, temperature changes, the addition of solidifying agents, the addition of catalysts, or allowing time to pass. A person having ordinary skill in the art may know the specific steps required to solidify the material being used. In some embodiments of the method, air bubbles must be removed from within the material that solidifies, as air bubbles can damage structural integrity of the material that solidifies. These air bubbles may be removed by vibrating the material that solidifies before it has solidified.

In places where the description above refers to particular implementations of an apparatus for creating openings in solidifying materials, it should be readily apparent that a number of modifications may be made without departing from the spirit thereof and that these implementations may be applied to other systems and methods of creating openings in solidifying materials.

I claim:

1. An apparatus for creating an opening in a material that solidifies, comprising:
    a rigid board, wherein the rigid board comprises at least one retainer plate slot each retainer plate slot leading to an opening therethrough;
    at least one rigid retainer plate configured to be inserted into the at least one retainer plate slot and to be passed entirely through the corresponding opening in the rigid board, wherein the at least one retainer plate comprises:
      at least one hydrostatic plate;
      at least one buoyancy plate, wherein the at least one buoyancy plate is coupled to the hydrostatic plate; and
      at least one retainer tie, wherein the at least one retainer tie is coupled to at least one of the hydrostatic plate and the buoyancy plate and the at least one retainer tie is oriented to run perpendicular to a lengthwise direction of the at least one hydrostatic plate.

2. The apparatus of claim 1, wherein the rigid board is composed of high density foam.

3. The apparatus of claim 1 wherein each retainer plate comprises one hydrostatic plate and one buoyancy plate, the plates being coupled at a single edge forming a right angle.

4. The apparatus of claim 3 wherein both the hydrostatic plate and the buoyancy plate each further comprise an opening in the same shape as the hydrostatic plate or the buoyancy plate.

5. The apparatus of claim 1 wherein each retainer plate comprises one hydrostatic plate, the hydrostatic plate comprising a first end and a second end, at least one buoyancy plate being coupled to the first end and the second end of the hydrostatic plate.

6. The apparatus of claim 4 wherein each retainer plate further comprises at least one buoyancy plate coupled to the hydrostatic plate between the first end and the second end of the buoyancy plate.

7. The apparatus of claim 1 wherein each retainer tie further comprises a first end and a second end and each retainer tie is positioned as such so that the first end and the second end extend outside of the retainer plate slot and the opening in the rigid board when the retainer plate slot is fully inserted through the retainer plate slot and opening in the rigid board.

8. A method of creating an opening in a material that solidifies, comprising:
    inserting at least one rigid retainer plate into at least one retainer plate slot within a rigid board, wherein each retainer plate slot further comprises an opening configured so that each retainer plate is passed entirely through the rigid board and the at least one rigid retainer plate comprises at least one hydrostatic plate and at least one retainer tie and the at least one retainer tie is oriented to run perpendicular to a lengthwise direction of the at least one hydrostatic plate;
    coupling a first end of the at least one retainer tie to a first formwork panel;
    coupling a second end of the at least one retainer tie to a second formwork panel;
    pouring the material that solidifies into a space between the first and second formwork panels;
    uncoupling the first formwork panel from the first end of the at least one retainer tie after the material is solidified;
    uncoupling the second formwork panel from the second end of the at least one retainer tie after the material is solidified; and
    removing the rigid board from the solidified material.

9. The method of claim 8, wherein removing the rigid board further comprises:
    removing the at least one rigid retainer plate from the at least one retainer plate slot; and
    disposing of the rigid board in a waste receptacle.

10. The method of claim 8, wherein removing the rigid board further comprises:
    removing the at least one rigid retainer plate from the at least one retainer plate slot; and
    recycling the rigid board.

11. The method of claim 8, wherein pouring the material that solidifies further comprises curing the material that solidifies.

12. The method of claim 8, wherein pouring the material that solidifies further comprises creating a condition that solidifies the material.

13. The method of claim 8, wherein pouring the material that solidifies further comprises removing air bubbles from the material that solidifies via vibration.

14. The method of claim 8, wherein the material that solidifies comprises concrete, a resin, water, metal, plaster, a ceramic, or glass.

15. The method of claim 8, wherein removing the rigid board further comprises:
   removing the at least one rigid retainer plate from the at least one retainer plate slot; and
   recycling the at least one rigid retainer plate.

16. A method of creating an opening in concrete, comprising:
   inserting at least one rigid retainer plate into at least one retainer plate slot within a rigid board, wherein each retainer plate slot further comprises an opening configured so that each retainer plate is passed entirely through the rigid board and the at least one rigid retainer plate comprises at least one hydrostatic plate and at least one retainer tie and the at least one retainer tie is oriented to run perpendicular to a lengthwise direction of the at least one hydrostatic plate; retainer tie;
   coupling a first end of the at least one retainer tie to a first formwork panel;
   coupling a second end of the at least one retainer tie to a second formwork panel;
   pouring the concrete into a space between the first and second formwork panels;
   uncoupling the first formwork panel from the first end of the at least one retainer tie after the concrete is hardened;
   uncoupling the second formwork panel from the second end of the at least one retainer tie after the concrete is hardened; and
   removing the rigid board from the hardened concrete.

17. The method of claim 16, wherein pouring the concrete further comprises removing air bubbles from the concrete via vibration.

18. The method of claim 16, wherein removing the rigid board further comprises:
   removing the at least one rigid retainer plate from the at least one retainer plate slot; and
   disposing of the rigid board in a waste receptacle.

19. The method of claim 16, wherein removing the rigid board further comprises:
   removing the at least one rigid retainer plate from the at least one retainer plate slot; and
   recycling the rigid board.

20. The method of claim 16, wherein removing the rigid board further comprises:
   removing the at least one rigid retainer plate from the at least one retainer plate slot; and
   recycling the at least one rigid retainer plate.

\* \* \* \* \*